Figure 1:
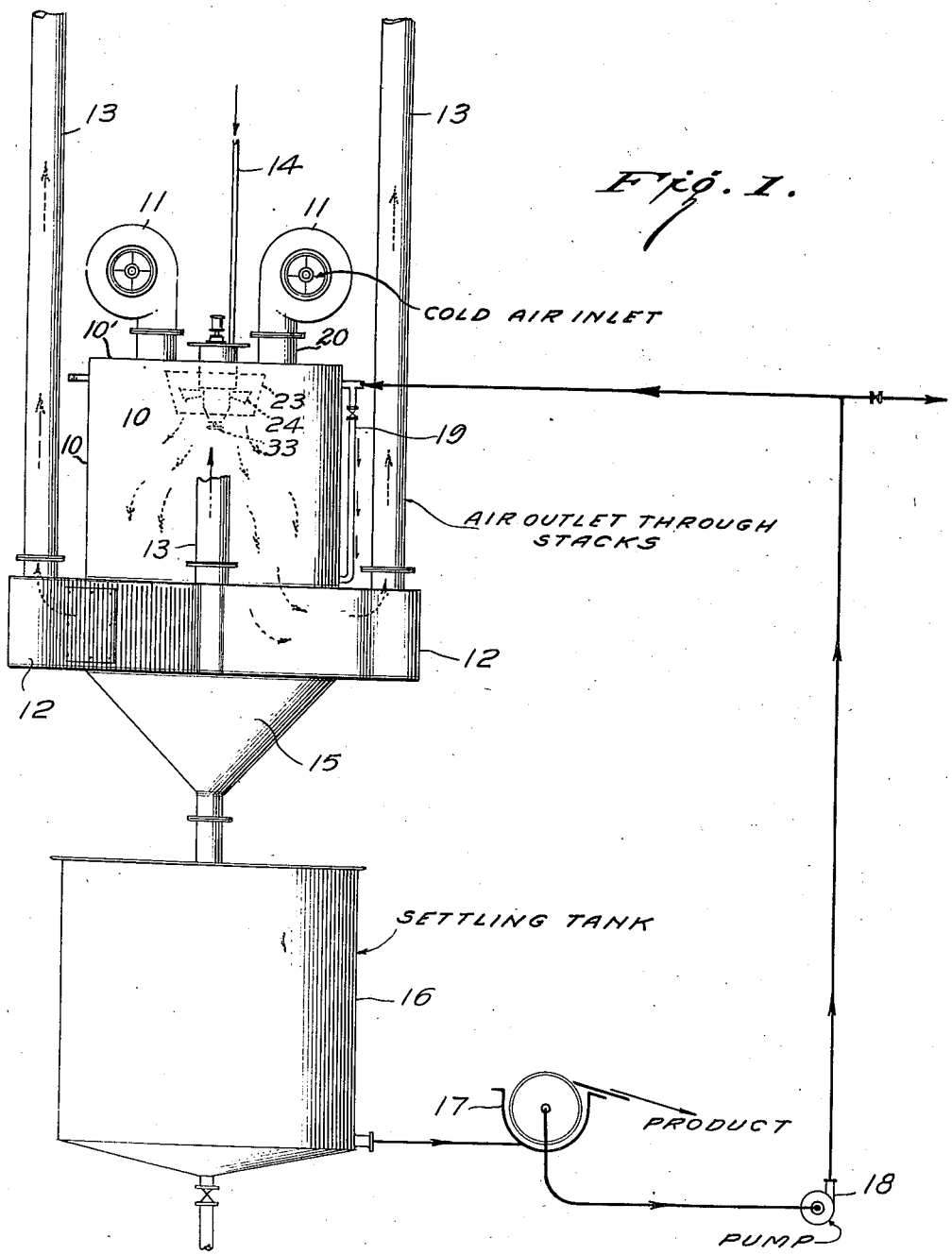
Figure 2:
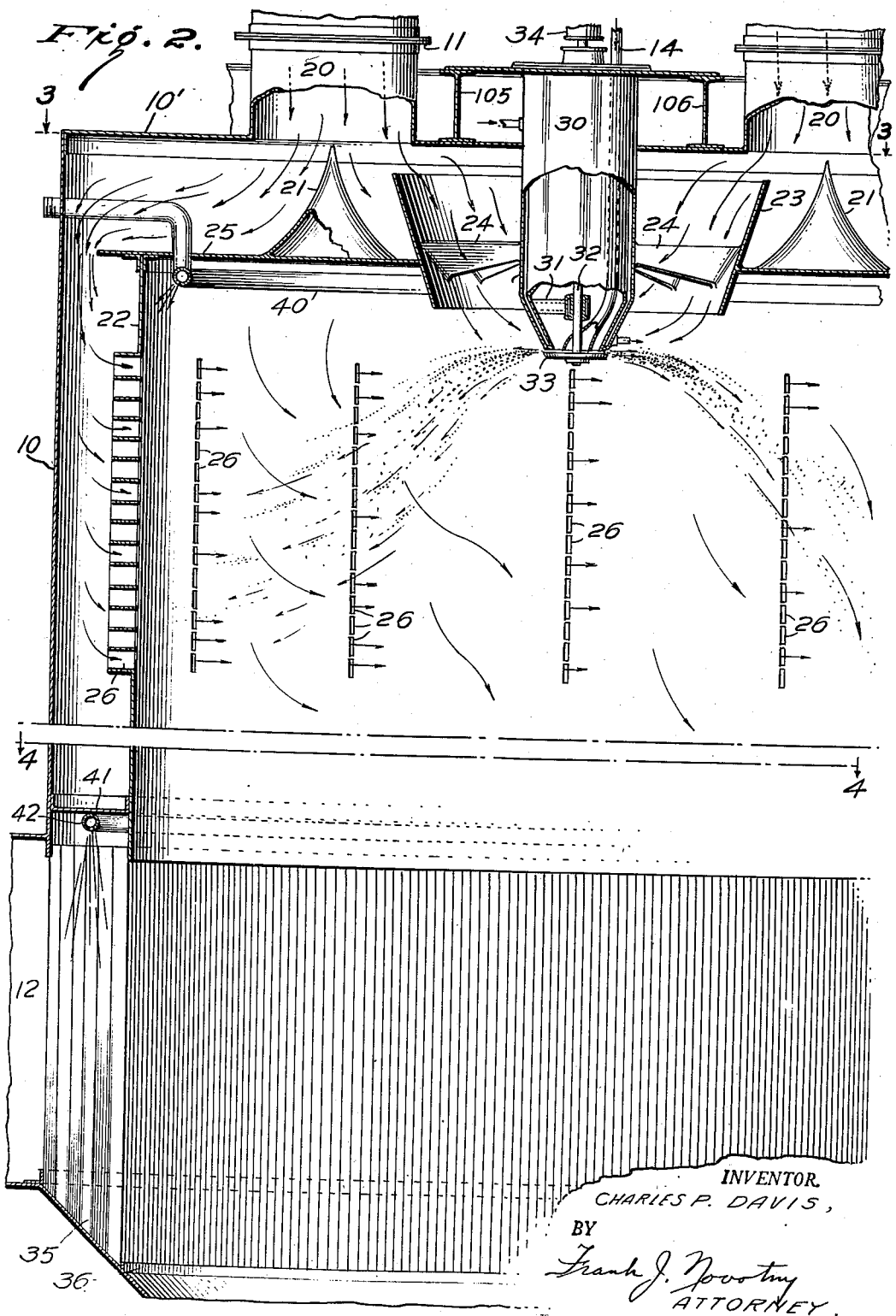
Figure 3:
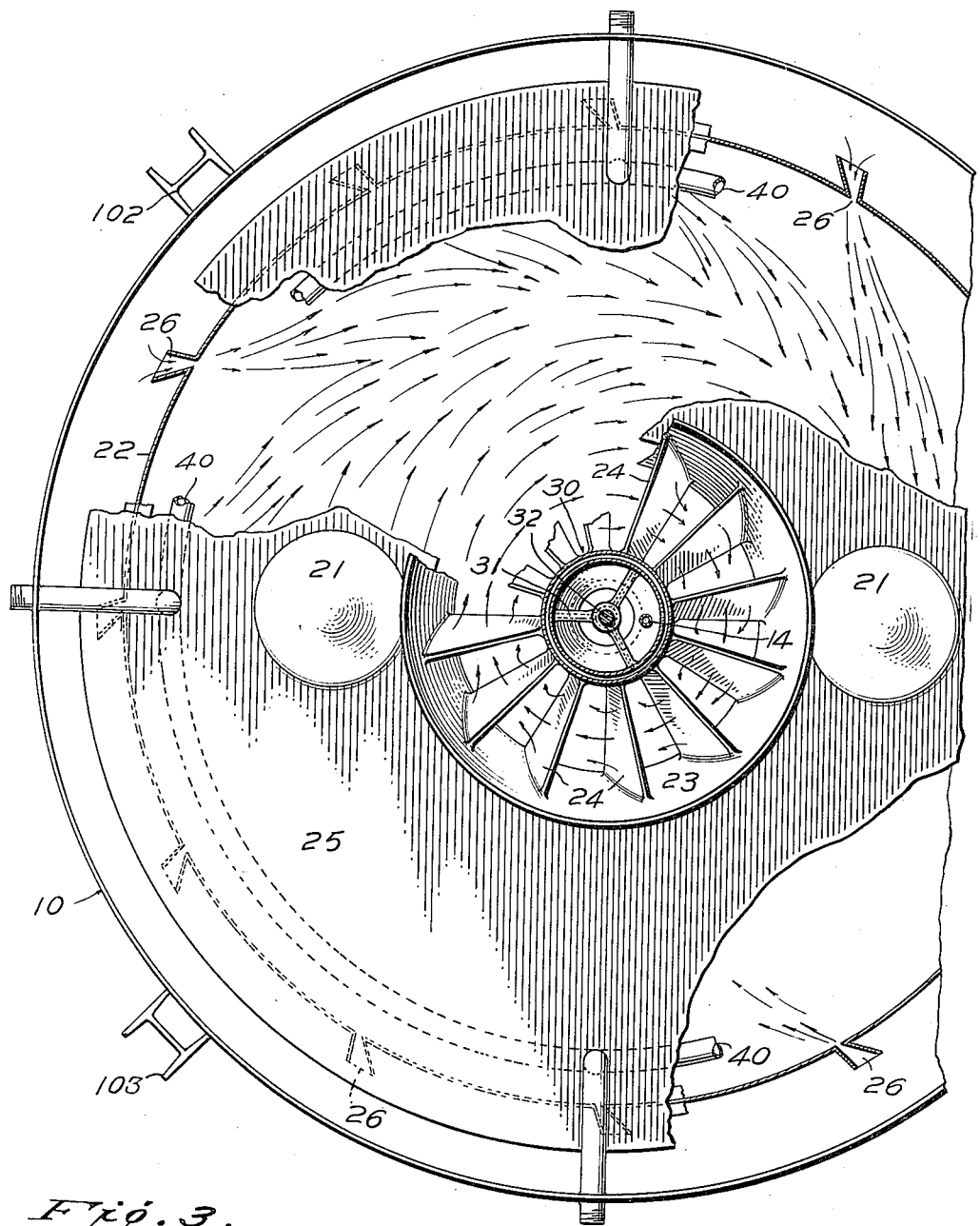

March 19, 1946.   C. P. DAVIS   2,396,689
SPRAY CRYSTALLIZING APPARATUS
Filed Dec. 10, 1942   4 Sheets-Sheet 4

INVENTOR.
CHARLES P. DAVIS,
BY Frank J. Novotny
ATTORNEY.

Patented Mar. 19, 1946

2,396,689

UNITED STATES PATENT OFFICE 2,396,689

SPRAY CRYSTALLIZING APPARATUS

Charles P. Davis, Stamford, Conn., assignor to American Cyanamid Company, New York, N. Y., a corporation of Maine Application December 10, 1942, Serial No. 468,604

6 Claims. (Cl. 159—4)

This invention relates to a novel apparatus for the crystallization or especially the spray crystallization of materials from their solutions. More particularly, it embraces means for the preparation of nitroguanidine in the form of extremely small crystals by whirling a solution of nitroguanidine from a rapidly spinning disc into a counter-flowing air current or air currents under such conditions as to cause a rapid cooling of the solvent, the latter being usually water.

Heretofore a number of different methods and apparatus for spray treatment, comminuting and crystallizing substances from their liquid or solution form have been suggested and described. However, each substance which is capable of being prepared in a dry or semi-dry form necessitates its own particular type of treatment in order to attain such efficiency and such yields of the product as to render the process commercially expedient. In the particular problem faced in the present process, the apparatus herein described was devised and entailed so many complete changes of equipment and treatment of the solution being processed as to result in the introduction of entirely new principles of crystallization. This particular apparatus of spray crystallizing is based on the principle of an impinging current or currents of air meeting and shock cooling a very finely atomized spray of nitroguanidine solution. Preferably two concentric or coaxial blasts of air are caused to undergo a clockwise rotation within a closed cylinder or drum while the product is sprayed in a counter-clockwise direction into and/or between the resultant concentric or coaxial vortices of air. In one embodiment, a mist of liquid having a high initial temperature impinges upon a countercurrent of air having a low initial temperature to effect a shock cooling of the hot liquid.

In the past it has been difficult and frequently impossible to prepare such crystalline substances as, for instance, nitroguanidine, in the form of discrete crystals less than 15 microns in width and less than 300 to 400 microns in length. In the process of preparing crystalline nitroguanidine, the principal use of which is as an ingredient for explosives, considerable difficulty has been experienced in the preparation of crystals of sufficiently small size, for a number of reasons. Slow crystallization from a solution has been found to produce coarse particles which necessitate subsequent grinding. Such grinding results only in a reduction in the length of the treated crystal; there is no effective reduction in the width or diameter of the crystal. However, the usual methods of crystallization or recrystallization, even when supplemented by subsequent grinding, invariably result in the obtainment of much larger crystals except when effected under commercially unfeasible conditions. Furthermore, the grinding of explosive crystalline materials in order to prepare a finely divided product is a distinct hazard to the workmen engaged therein and may result in disastrous explosions causing considerable damage to the personnel, plant and adjacent apparatus.

It is an object of this invention to prepare crystalline materials of an extremely small size, the particles showing a relatively uniform distribution ranging from 1 to 10 or more microns in width, the bulk of the material, however, lying substantially between 2 to 4 microns in width. It is a further object to prepare such substances by means of a continuously operable process. A still further object is to provide an economical process for effecting this crystallization. Another object is to prevent crystal growth to excessive size and prevent crystal aggregation during the process of crystallization. Still another object is to effect a shock cooling or sudden chilling of the solute.

Various other and ancillary objects and advantages of the invention will become apparent from the following description and exemplifications, given merely to illustrate the nature of the invention and not in limitation thereof.

The process herein described involves a substantially different method of treating a solution of nitroguanidine than any heretofore used and effects a substantial saving in the cost of manufacturing the crystalline product. It results in a crystalline grain size heretofore impossible to obtain in production on a large scale. The product which is obtained in such small size is highly sensitive and detonates with considerably more destructive violence than similar products heretofore prepared. Also as a result of this invention, the physical properties of the product are greatly improved, the product having a needle-like form which tends to aggregate in felt-like masses.

In general, this invention embodies apparatus for preparing a crystalline substance in a finely divided state by spray-treating solutions of the crystalline substance. The solvent for these spray solutions may be water or may be an inorganic, organic or a mixed solvent. Preferably, the substances to be sprayed are substantially insoluble or relatively insoluble in the solvent used at relatively low temperatures and relatively slightly more soluble at somewhat higher temperatures. The highest temperatures used are preferably still somewhat below the temperature at which decomposition of the solute or solvent takes place.

Referring now, more particularly, to the apparatus itself in one embodiment it contemplates the formation of an aqueous solution of the crystalline substance at such a concentration that a more concentrated solution results when it is cooled, evaporated or super-cooled as by shock cooling to a higher concentration as by spraying the hot solution into a chamber wherein a constantly circulating gas, such as air, is maintained. This results in the incipient formation of minute crystals in every drop or mist particle. These small crystals deposit on the walls, floors, and deflector plates of the apparatus described below in more detail and are subsequently washed therefrom and collected.

As a still further specific embodiment of the principles of this invention, the cooling, shock cooling and/or evaporation step embraces the spraying of the solution into a countercurrent flow of air or between two currents of air both flowing countercurrent to the direction of the spray. In either case, the extremely rapid cooling and/or evaporation effects obtained result in the precipitation of exceedingly minute crystals having a size which in the bulk shows a highly desirable distribution of particles in a range of 2 to 4 microns in width, all being of uniform purity.

The result of utilizing the principles herein described in an embodiment of this invention as by discharging, i. e., spraying, a 4.0% to 8.0% aqueous solution of nitroguanidine at 85° to 110° C. into a spray chamber and into a circulating current of air flowing countercurrent to the direction of the spray, yields pure crystalline nitroguanidine of a degree of subdivision far superior to that heretofore obtainable with ordinary methods of spray crystallization. In addition, this invention, by preventing further and excessive cooling and evaporation of the solute, as by washing the crystals down with mother liquor, or wash liquor or any other liquid available from the apparatus or from a previous crystallization, results in minute crystals and a more easily circulated slurry. The crystals, thus treated and collected, are incapable of further growth and the bulk of them have a size of the order of less than 5 microns in width (i. e., 2 to 4 microns) and less than 150 microns in length.

Preferably, the concentration of nitroguanidine solution used in the process of this invention is approximately 8.0% or slightly less at which concentration the solution necessitates heating at or near the temperature of boiling water and under atmospheric pressure in order to dissolve the solute completely. Higher concentrations necessitate operation at higher temperatures and under superatmospheric pressure.

The invention accordingly comprises the features of construction, combination and arrangement of parts, adapted to effect such steps, and the article possesses the characteristics, properties and size, which are exemplified in the detailed disclosures herein set forth.

In the accompanying drawings, forming a part of the specification and showing, for purposes of exemplification, preferred forms of this invention without limiting the claimed invention to such illustrative instances:

Fig. 1 is a modified flow sheet, partially diagrammatic, showing the complete apparatus in working arrangement for the continuous spray crystallization of a dissolved substance;

Fig. 2 is an enlarged vertical sectional view of the spray drier itself, with parts broken away in order to show the details of its structure more clearly;

Fig. 3 is a view taken on the line 3—3 of Fig. 2, looking down upon the cover of the inner spray chamber, and Fig. 4 is a sectional view taken on the line 4—4, Fig. 2, again with portions broken away to show the deflecting plates and other construction details more clearly.

Referring now, more particularly, to the drawings, air is blown into the top of an external air-chamber 10, having a top 10', Fig. 1, by the blower units 11. Within the chamber 10 the air is given a swirling tangential direction of flow by specially adapted louvers described in more detail below. After passing through deflecting plates adapted to catch and hold any fine crystalline deposits, or precipitate, the air passes out through manifold chambers 12 which are exhausted by means of stacks 13 the draught in which aids the removal and circulation of air through the apparatus.

The solution to be spray treated enters through pipe 14 and the crystalline product and wash water collect on the cone-shaped bottom 15 of the apparatus whereafter they are passed to the settling tank 16 and then to the Oliver filter 17 where the crystalline product is separated from the mother or wash liquor and packaged. The wash liquor is circulated by the pump 18 to wash down the crystalline materials collecting on the walls and deflector plates of the apparatus 10.

The vertical cross section of the spraying apparatus illustrated in Fig. 2 shows the details of its construction very clearly. The blower units 11 force air through the ducts 20. Preferably four ducts are used in order to get a more uniform distribution of air pressure. The entering air impinges on pyramidal deflecting cones 21 which cause a small tornado or turbulent flow and results in the deflection of the air into the inner spray chamber 22 by two different routes. One entrance for the air into the inner chamber 22 is through cone-shaped member 23 and over the stationary air vanes 24 which impart a clockwise motion (looking downwards axially) to the air. The other entrance for the air under pressure is across the cover 25 of the inner chamber 22 down into the annular space between the inner and outer chambers and through the vertical rows of tangential nozzles 26 (see also Fig. 3) into the inner spray chamber. The nozzles 26 also give the air current, when looked upon from above, a clockwise rotation in the inner spray chamber 22.

The solution of the product to be sprayed is fed through pipe 14 and enters the steam jacketed member 30 which simultaneously serves as a support for the inner ends of vanes 24 and as a bearing support 31 for the shaft 32 of atomizing disc 33. Disc 33 is driven counterclockwise through shaft 32 and pulley 34 by means of a motor and belt (not shown) at a speed of approximately 9000 R. P. M. Pipe 14 feeds the solution on to the top of the atomizing disc 33.

The liquid is discharged at the edge of the disc 33 as a horizontal spray directly into and somewhat countercurrent to the vortex of gases (air). This fine spray is prevented from contacting the top 25 of the inner chamber by the downward flowing air current entering through vanes 24.

The air entering tangential ports 26 prevents the spray from contacting the walls 22 of the inner chamber. As a result, the sprayed material is kept in constant contact on all sides with a current of air. This effects a rapid, efficient cooling of the sprayed particles. It is to be noted that the direction of movement of the sprayed particles is somewhat countercurrent to the flow of the two vortices of air. In the spray crystallizer all the parts wetted by the solution are preferably stainless steel or rubber-covered steel.

The result of this treatment is the production of an enormous surface of contact and a tremendous mechanical jostling of the sprayed particles both of which were heretofore impossible to attain in standard apparatus. Thus, the purpose of this method of treating a solution of nitroguanidine is, first, to provide an extremely fine subdivision of the sprayed solution such that the spray particle itself is so small that it can produce only one crystal of the desired dimensions, and second, to shock cool that spray or mist particle so as to form that small crystal before two such spray particles have the opportunity to coalesce into a bigger droplet.

In order to remove any of the sprayed material from the inner side of wall 22 a pipe 40 is provided fitted with special spray head nozzles. This pipe is supplied with wash or mother liquor by pump 18, Fig. 1, to clean down the walls 22 and prevent further crystal growth and to dilute the crystalline slurry to a more suitable concentration for facilitating the conveying and pumping of the slurry as well as speeding up the settling and filtering steps.

Figure 4:
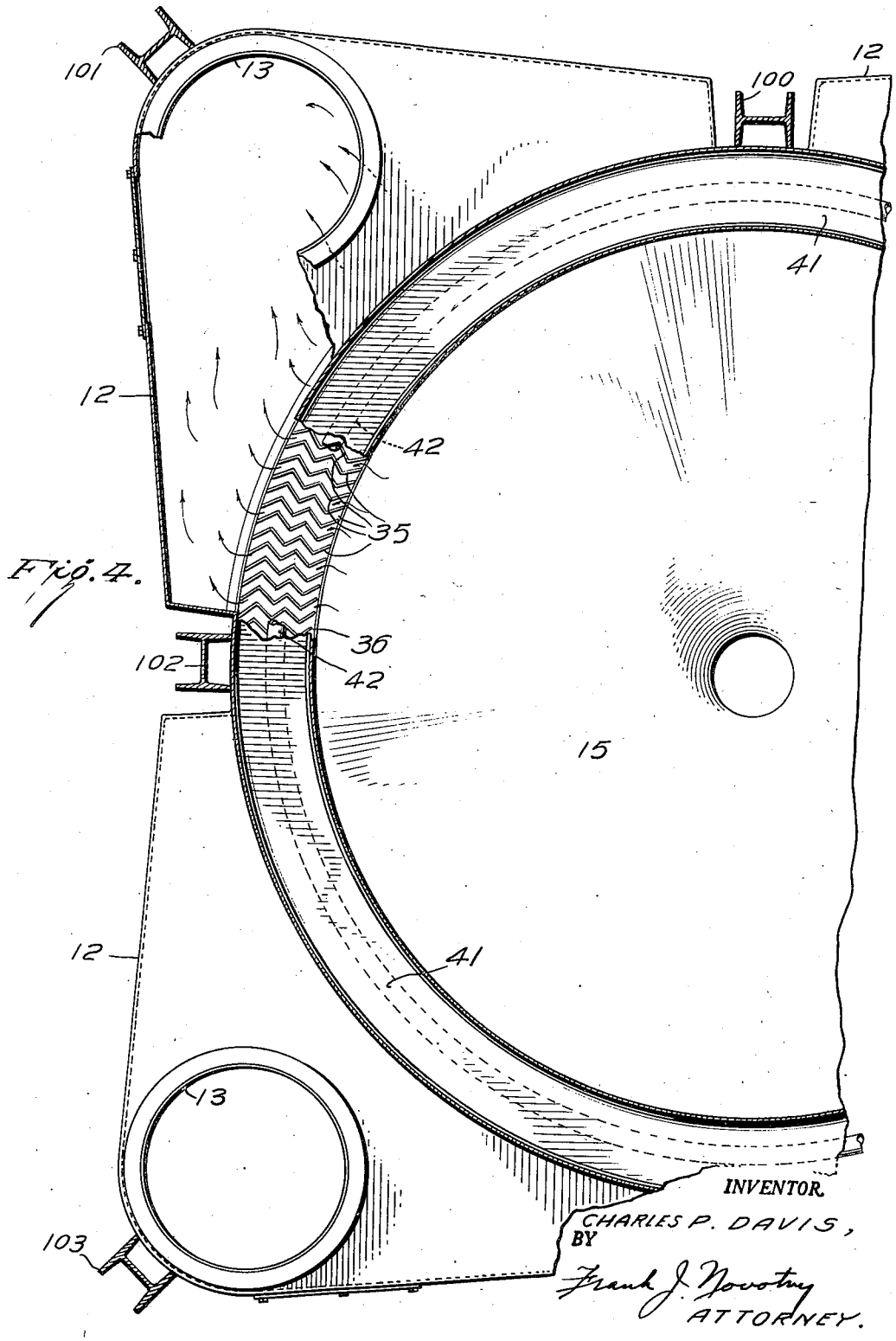

The space between the outer wall 10 and the inner wall 22 is closed at the bottom, just above the manifold 12 by an annular plate 41. The annular space in the lower end of the apparatus, directly below the annular plate 41, contains a continuous ring of eliminator or deflector blades 35 which are preferably rubber-covered and made up of units of 5 or 10 blades for ready insertion and removal in the above annular space. The deflector blades 35 are readily slid into place by inserting their upper ends in the space between the inner and outer spray chambers and then resting the sloping bottoms of the deflector blades on the cone-shaped bottom 15 of the spray tower just above the supporting shelf formed by the vertical flanges 36. The deflecting blades 35 are corrugated or folded as shown in Fig. 4 and open on their inner edges into the spray chamber and on their outer edges into the manifold chambers 12. With this arrangement of the folded blades, the emerging air carrying the fine spray with its included fine crystalline precipitate is caused to impinge upon the sides of the deflector blades and the crystals collect on the irregular surface of the blades. The crystalline product collected on the blades 35 is periodically or continuously removed by washing down the space between the blades by means of wash sprays supplied from the pipe header 42, which is connected to the recirculating wash water from pump 18 by the connecting pipe 19 shown in Fig. 1.

Since certain changes may be made without departing from the scope of the invention, it is intended that all matter contained in the above description shall be interpreted as illustrative and not in a limiting sense except as defined by the appended claims.

Although the operation of the apparatus is described as utilizing two currents of air rotating in clockwise direction and a spray current in counterclockwise rotation, it is obvious that the two air currents may rotate counterclockwise and the spray current clockwise. Also, warm or cold air may be supplied to the blower units 11 depending upon the concentration of the solution and the degree of evaporation necessary to cause incipient precipitation of the solid crystalline solute.

With the construction above described, no supports other than the various I-beams shown, namely 100, 101, 102, 103, Fig. 4; 102, 103, 104, Fig. 3, and 105, 106, Fig. 2, and no other structural steel beams are required for the support of the apparatus outside or inside the spray chamber other than the above enumerated I-beams.

The adjustment of the fan speed and drive can be used to alter the volume and velocity of the air admitted and coursing through the spray treating apparatus.

As an illustration of the type of product obtainable with the apparatus of this invention, the following examples are given.

Example 1

A 7.5% aqueous solution of nitroguanidine is heated to 110° C. and fed into the spray crystallizer apparatus through the conduit leading to the spinning disc and at the rate of 45 gallons per minute. The blowers are simultaneously operated and mother liquor supplied in order to dilute the solution to about 5.5% to 7.5% solids while washing down the walls and eliminator blades of the spray crystallizer. The mother liquor is circulated at the rate of about 1200 gallons per minute. This results in the obtainment of extremely small crystals of nitroguanidine and their extraction is effected on the Oliver filter. The spinning disc is driven at a speed of about 9000 revolutions per minute in order to produce extremely small droplets of the nitroguanidine solution. Shock cooling of the solution effects precipitation of the minute nitroguanidine crystals which are readily recovered by an Oliver or similar type filter.

This apparatus operates on the fundamental principle that a liquid fed to the upper surface of a disc rotating at an extremely high speed is dispersed in the form of extremely small droplets in the nature of a fine mist.

Example 2

A hot aqueous solution (about 95° C. or higher) of nitroguanidine of approximately 8% strength is introduced on the top surface of a spinner wheel rotating at about 8000 R. P. M. and dispersed as extremely small droplets, or as a mist. A countercurrent of air is introduced into the apparatus and the droplets of solution are of such small size that they cool from a temperature of about 95° to 100° C. down to about 30° C. while simultaneously precipitating out minute crystals of nitroguanidine not more than 5 microns in diameter and 150 microns in length. Actually, a great number of crystals 3 microns in diameter and 80 microns in length are obtained upon filtering the crystal product from the slurry formed by washing down the deflector plates with mother liquor from a previous batch and extracting the slurry on the Oliver filter shown.

Although the examples above given are specific to the preparation of nitroguanidine in finely divided crystalline form, it is obvious that the apparatus can also be utilized for the preparation of other substances such as Epsom salt, boric acid, citric acid, and the like, in finely divided form.

In general, this invention contemplates in its broadest scope an apparatus for spraying and scattering of droplets by the formation of a mist or otherwise breaking up a solution of a crystalline substance in a chamber through which a current of gas such as air is circulating countercurrent thereto, and at room temperature, to effect the evaporation and/or shock cooling of the solution to a point of supersaturation short of drying. It is to be noted that a dried product is not collected. Each small droplet of the solution or mist is scattered and subjected to a violent mechanical jostling or turbulent flow exposing an enormous surface of contact of the droplets to the cooling action of the circulating air or gas. In falling through the circulating gas, the droplets are cooled very quickly or shock cooled by the rapidly changing flow of gas and by the simultaneous evaporation of the solvent to a temperature at which they are in a more concentrated condition or perhaps even supersaturated with the solid. As a result, very fine crystals of the solute suspended in the solvent are formed and are carried against and impinge upon the deflector plates. Any crystals deposited upon the sides and bottom of the spray chamber or on the deflector plates are washed down by the spray of mother liquor constantly flowing through the chamber. This wash water is the filtrate from a previously sprayed solution, thus making the process continuous; this wash water results in the formation of a more readily pumpable or circulating slurry from which the fine crystals are later extracted by a simple filtration step.

This invention is not to be limited by any theory as to its mode of operation. However, it is believed that this apparatus quickly and efficiently cools the droplets of sprayed solution by evaporation of the solute, conduction of the contained heat in each droplet, convection of this heat, and the like. As a result, each droplet or mist particle of the highly atomized solution is quickly and individually cooled and a finely divided crystalline product appears suspended in a liquid matrix. The vortex of air produced results in a turbulence and a constant changing of the surface of each sprayed drop and its accompanying surface tension so that each particle is jostled and subjected to a rapid evaporation of the contained solvent.

It is to be understood that the above description and the examples given are merely illustrative embodiments of this invention and not limitative thereof, and that the invention is to be broadly construed and limited solely by the appended claims.

I claim:

1. Apparatus for spray crystallizing substances from their solutions which comprises a cylindrical chamber having an axis and being closed by a circular cover at one end and by a crystal collecting cone-shaped member at the other end, both being centered with respect to the axis, means in the upper end of said chamber for supplying a first spiral blast of air along the axis, means for supplying a second spiral blast of air radially disposed with respect to the first blast and concurrent therewith, means disposed on the axis and passing through the cover for spraying droplets of the solution into and approximately radially to the blasts of air, whereby the solution is shock cooled and evaporated to effect crystal formation in the droplets, corrugated deflecting plates against which the blasts of air impinge for collecting the droplets and the contained crystals, means for washing down the deflecting plates to form a slurry from the crystals, and filters for separating out the crystalline product.

2. Apparatus according to claim 1 wherein the means for spraying droplets of the solution comprises a wheel, to the surface of which the solution is applied, the wheel rotating at approximately 9000 R. P. M. while the droplets issue from the rim of the wheel in the form of a fine mist.

3. Apparatus according to claim 1 wherein the means for supplying the second spiral blast of air comprises approximately tangentially disposed nozzles cut in the cylindrical chamber for conveying blasts of air into the chamber and to one and the same side of the axis.

4. Apparatus for spray crystallizing substances from their solutions which comprises an inner cylindrical chamber having a cylindrical wall, a vertical axis and an upper and lower end and provided with a circular cover at the upper end and remaining open at the lower end, a wall concentric with the inner wall and forming an outer cylindrical chamber of the same length but of larger radius than, and coaxial with the inner chamber, the outer chamber likewise having an upper and lower end and provided with a circular cover at the upper end and sealed to the inner chamber at its lower end whereby an air space is provided between the tops and sides of the cylindrical chambers, conduits in the cover of the outer chamber for supplying blasts of air to the air space, means in the cover of the inner chamber for supplying a first spiral blast of air from the air space along the axis, means in the cylindrical wall of the inner chamber for supplying a second blast of air from the air space in the form of a plurality of individual blasts introduced in a tangential direction into the inner cylindrical chamber, the second blast of air being radially disposed with respect to the first blast of air, a centrifugal atomizer mounted axially within the inner chamber and passing through the cover for spraying droplets of the solution outwardly across the first spiral blast of air whereby the solution is shock cooled and evaporated to effect crystal formation in each droplet, corrugated deflecting plates disposed vertically below the said air space and arranged radially and extending outwardly from the space below the open lower end of the inner chamber, spaced to provide air passages between the said plates and against which plates the blasts of air impinge for collecting the droplets and contained crystals means for supporting the deflecting plates and means for removing the droplets and contained crystals from the apparatus.

5. Apparatus for spray crystallizing substances from their solutions which comprises an inner cylindrical chamber having a cylindrical wall, a vertical axis and an upper and lower end and provided with a circular cover at the upper end and remaining open at the lower end, a wall concentric with the inner wall and forming an outer cylindrical chamber of the same length but of larger radius than, and coaxial with the inner chamber, the outer chamber likewise having an upper and lower end and provided with a circular cover at the upper end and sealed to the inner chamber at its lower end whereby an air space is provided between the tops and sides of the cylindrical chambers, conduits in the cover of the outer chamber for supplying blasts of air to the air space, a funnel-shaped air inlet conduit means disposed axially in the chambers and having its narrowest portion extending into the inner chamber, fan blades extending across the funnel-shaped air inlet for supplying a first spiral blast of air from the air space along the axis, means in the cylindrical wall of the inner chamber for supplying a second blast of air from the air space in the form of a plurality of individual blasts introduced in a tangential direction into the inner cylindrical chamber, the second blast of air being radially disposed with respect to the first blast of air, a centrifugal atomizer mounted axially within the inner chamber and passing through the cover for spraying droplets of the solution outwardly across the first spiral blast of air whereby the solution is shock cooled and evaporated to effect crystal formation in each droplet, a ring of deflector plates having angular corrugations disposed vertically and downwardly below the said side air space and spaced to provide air passages between the said plates, and against which plates the blasts of air impinge for collecting the droplets and contained crystals, means for supporting the deflecting plates and means for removing the droplets and contained crystals from the apparatus.

6. Apparatus for spray crystallizing substances from their solutions which comprises an inner cylindrical chamber having a cylindrical wall, a vertical axis and an upper and lower end and provided with a circular cover at the upper end and remaining open at the lower end, a wall concentric with the inner wall forming an outer cylindrical chamber of the same length but of larger radius than, and coaxial with the inner chamber, the outer chamber likewise having an upper and lower end and provided with a circular cover at the upper end and sealed to the inner chamber at its lower end whereby an air space is provided between the tops and sides of the cylindrical chambers, conduits in the cover of the outer chamber for supplying blasts of air to the air space, a funnel-shaped air inlet conduit means disposed axially in the cover of the inner chamber and having its narrowest portion extending into the inner chamber, fan blades extending across the funnel-shaped air inlet for supplying a first spiral blast of air from the air space along the axis, a plurality of sets of vertically arranged nozzles disposed tangentially at intervals along the cylindrical wall of the inner chamber for supplying a second blast of air from the air space, a centrifugal atomizer mounted axially within the inner chamber and passing through the cover for spraying droplets of the solution outwardly across the first spiral blast of air whereby the solution is shock cooled and evaporated to effect crystal formation in each droplet, a ring of deflector plates having angular corrugations disposed vertically and downwardly below the said side air space and spaced to provide air passages between the said plates, and against which plates the blasts of air impinge for collecting the droplets and contained crystals means for supporting the deflecting plates and means for removing the droplets and contained crystals from the apparatus.

CHARLES P. DAVIS.